US007894973B2

(12) United States Patent
Mallebrein et al.

(10) Patent No.: US 7,894,973 B2
(45) Date of Patent: Feb. 22, 2011

(54) METHOD AND DEVICE FOR OPERATING AN INTERNAL COMBUSTION ENGINE

(75) Inventors: Georg Mallebrein, Korntal-Muenchingen (DE); Michael Frank, Vaihingen/Enz (DE); Alexander Schenck Zu Schweinsberg, Moeglingen (DE); Helerson Kemmer, Vaihingen (DE); Wolfgang Samenfink, Besigheim (DE)

(73) Assignee: Robert Bosch GmbH, Stuttgart (DE)

( * ) Notice: Subject to any disclaimer, the term of this patent is extended or adjusted under 35 U.S.C. 154(b) by 131 days.

(21) Appl. No.: 12/384,972

(22) Filed: Apr. 9, 2009

(65) Prior Publication Data

US 2009/0281709 A1 Nov. 12, 2009

(30) Foreign Application Priority Data

May 7, 2008 (DE) ....................... 10 2008 001 606

(51) Int. Cl.
*B60T 7/12* (2006.01)

(52) U.S. Cl. ........................ 701/104; 701/113; 123/431

(58) Field of Classification Search ......... 701/103–105, 701/113; 123/299, 300, 429, 431, 432
See application file for complete search history.

(56) References Cited

U.S. PATENT DOCUMENTS

| | | | | |
|---|---|---|---|---|
| 7,533,518 | B2 * | 5/2009 | Kurtz et al. | 60/285 |
| 7,581,531 | B2 * | 9/2009 | Schulz | 123/481 |
| 2006/0254259 | A1 * | 11/2006 | Kurtz et al. | 60/286 |
| 2009/0210133 | A1 * | 8/2009 | Kemmer et al. | 701/103 |

* cited by examiner

*Primary Examiner*—John T Kwon
(74) *Attorney, Agent, or Firm*—Kenyon & Kenyon LLP

(57) ABSTRACT

In a method for operating an internal combustion engine, a setpoint fuel quantity to be injected is subdivided into a first fuel quantity which is to be injected into an intake manifold of the internal combustion engine, and a second fuel quantity to be injected directly into a combustion chamber of the internal combustion engine. The subdivision of the fuel quantity is performed as a function of a temperature that is characteristic for the operation of the internal combustion engine, e.g., in a start of the internal combustion engine, and the ratio between the first fuel quantity and the second fuel quantity is continually modified as a function of the temperature.

8 Claims, 4 Drawing Sheets

METHOD AND DEVICE FOR OPERATING AN INTERNAL COMBUSTION ENGINE

BACKGROUND OF THE INVENTION

1. Field of the Invention

The present invention relates to a method and a device for operating an internal combustion engine, in which a setpoint fuel-injection quantity is subdivided.

2. Description of Related Art

Already known in the art are methods and devices for operating an internal combustion engine, in which a setpoint fuel quantity to be injected is subdivided into a first fuel quantity to be injected into an intake manifold, and into a second fuel quantity to be injected directly into a combustion chamber of the internal combustion engine, as a function of a temperature that is characteristic for the operation of the internal combustion engine in a start of the internal combustion engine. Depending on the engine temperature characteristic for the operation of the internal combustion engine, for example, a distinction is made between a cold start and a warm start of the internal combustion engine. In the cold start, it is known from the market to inject the setpoint fuel quantity to be injected solely via the first fuel quantity to be injected, into the intake manifold of the internal combustion engine. For the warm start, on the other hand, it is known to inject the setpoint fuel quantity to be injected solely via the second fuel quantity to be injected, directly into the combustion chamber of the internal combustion engine. The reason for this is a better mixture carburetion with the aid of the intake manifold injection in the cold start and reduced self-ignition and knocking tendencies in case of a direct injection into the combustion chamber in the warm start.

Fuel that is introduced into the intake manifold during the start of the internal combustion engine with a cold engine deposits on the walls of the intake manifold, does not fully evaporate, and therefore does not take part in the starting combustions. In order to ensure a stable engine run-up, an increased fuel mass is therefore required in the start phase.

At cold start temperatures of approximately 20° C., the proper homogenization of the air/fuel mixture of an intake manifold injection manifold injection already in front of the combustion chamber of the internal combustion engine results in low emissions, in particular of hydrocarbons, in comparison with a direct injection during the intake stroke of the internal combustion engine. An intake manifold injection is therefore advantageous in a cold start. At higher temperatures, a direct injection during the intake stroke of the internal combustion engine leads to reduced temperatures in the cylinder due to the evaporation of the fuel in the combustion chamber, and thus to lower knocking and self-ignition tendencies.

A dropping engine temperature or ambient temperature in a cold start of the internal combustion engine increases the wall film formation in the injection in the intake manifold, so that the fuel supply must be increased further. As a consequence, the undesired emissions of hydrocarbons, for example, rise during the start of the internal combustion engine.

BRIEF SUMMARY OF THE INVENTION

The method according to the present invention and the device according to the present invention for operating an internal combustion engine offer the advantage that a ratio between the first fuel quantity and the second fuel quantity is continuously modified as a function of the temperature. This enables a fluid transition between the portion of the first fuel quantity and the portion of the second fuel quantity of the setpoint fuel quantity to be injected for different temperatures that are characteristic for the operation of the internal combustion engine as a function of the temperature, so that the operation of the internal combustion engine is able to be optimized with regard to reducing undesired emissions, e.g., of hydrocarbons, during the start, as well with regard to preventing knocking and self-ignitions.

It is advantageous if at a first temperature value the first fuel quantity is selected smaller than the second fuel quantity, and at a second temperature value that is greater than the first temperature value, it is advantageous if the first fuel quantity is selected greater than the second fuel quantity. This makes it possible for the direct injection to outweigh the intake manifold injection given dropping engine or ambient temperatures in the cold start. This reduces the wall film formation for the lower temperature range of the cold start, so that no increased fuel injection is required and the undesired emissions are able to be reduced. For the upper temperature range of the cold start, on the other hand, the intake manifold injection outweighs the direct injection, so that the undesired emissions are reduced by the satisfactory homogenization of the air/fuel mixture due to the predominant intake manifold injection.

It is also advantageous if at a third temperature value that is greater than the second temperature value, the first fuel quantity is selected smaller than the second fuel quantity. This ensures that, once again, the direct injection outweighs the intake manifold injection in the warm start of the internal combustion engine, so that the knocking and self-ignition tendencies are less pronounced.

A further advantage results if the second fuel quantity is subdivided into a first partial quantity to be injected during an intake stroke, and into a second partial quantity to be injected during a compression stroke as a function of the temperature. In this way the share of the direct injection is able to be optimally adapted to the temperature that is characteristic for the operation of the internal combustion engine, with respect to lower undesired emissions as well as reduced knocking and self-ignition tendencies.

In this context it is advantageous if the subdivision of the second fuel quantity into the first partial quantity and into the second partial quantity is modified continuously as a function of the temperature. This enables a fluid transition between the first partial quantity to be injected and the second partial quantity to be injected, as a function of the temperature, thereby improving the adaptation of the operation of the internal combustion engine to the engine temperature or ambient temperature with respect to reducing undesired emissions and reducing any knocking and self-ignition, in particular during the start of the internal combustion engine.

In addition, it is advantageous if the first partial quantity is selected to increase with rising temperatures and if the second partial quantity if selected to decrease with rising temperatures. This ensures that in the lower temperature range of the cold start the direct injection predominantly occurs during the compression stroke. Thus, an injection takes place into already compressed, and therefore heated, air of the combustion chamber. This results in better evaporation of the directly injected fuel. In the lower temperature range of the cold start, the fuel quantity to be injected is thus able to be reduced considerably, which in turn decreases the undesired emissions. On the other hand, for the temperature range of the warm start, it can be ensured that the predominant share of the direct injection takes place during the intake stroke, so that the temperatures in the combustion chamber are reduced in this manner because of the cooling fuel, thereby reducing the knocking and self-ignition tendencies.

It is also advantageous if the first fuel quantity is formed from a first fuel type and the second fuel quantity is formed from a second fuel type that differs from the first fuel type. This makes it possible to use the present invention with the mentioned advantages also for an operation of the internal combustion engine in which different types of fuel are used at the same time.

DETAILED DESCRIPTION

Figure 1:
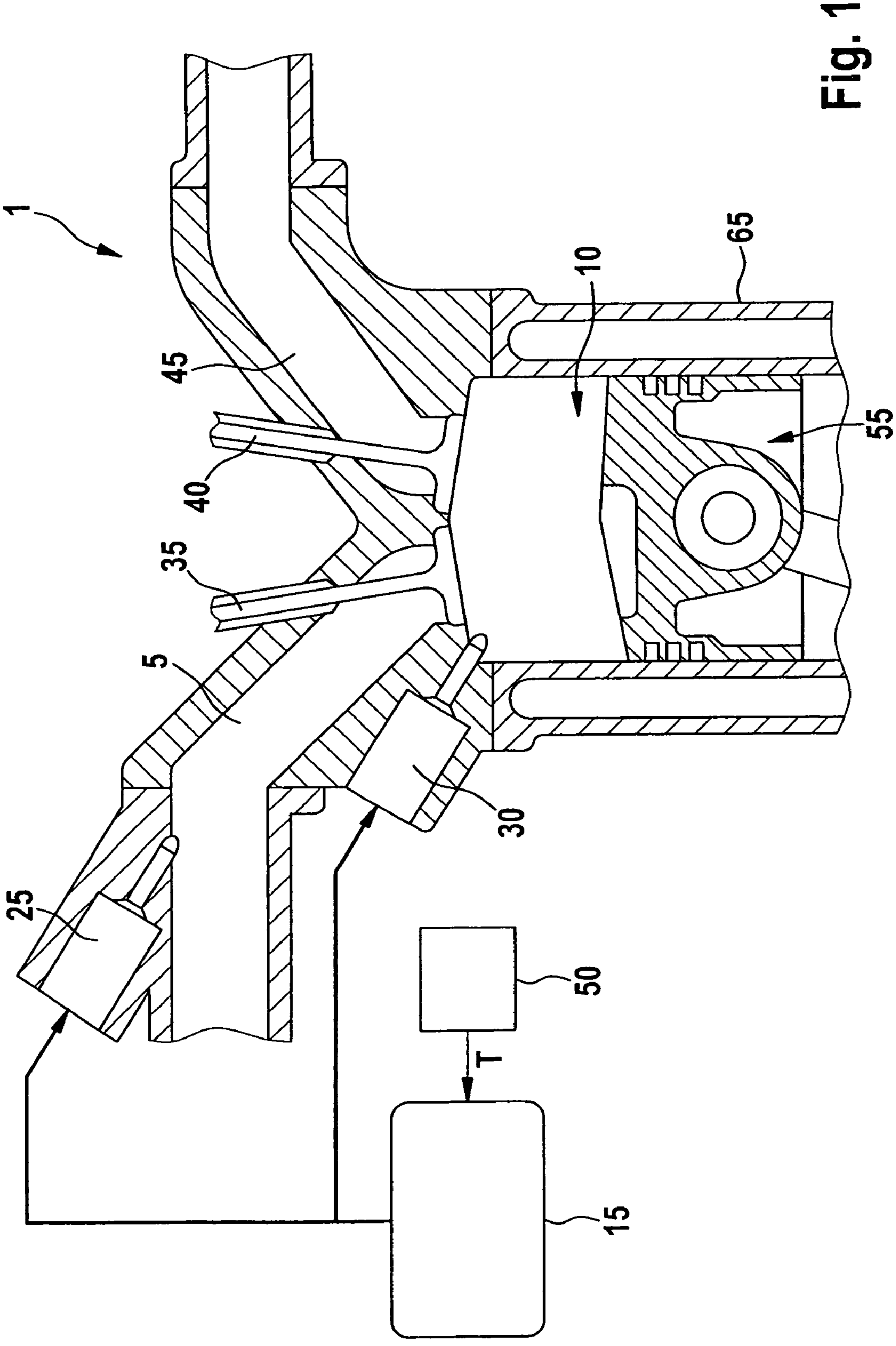
FIG. 1 shows a schematic view of an internal combustion engine.

In FIG. 1, reference numeral 1 denotes an internal combustion engine, which may take the form of a spark-ignition engine or a diesel engine. Internal combustion engine 1 includes one or a plurality of cylinder(s) 65, one of which is shown in FIG. 1 by way of example. Fresh air is able to be supplied to a combustion chamber 10 of cylinder 65 via an intake manifold 5. Furthermore, intake manifold 5 is able to be supplied with fuel via a first fuel injector 25. The air/fuel mixture thus produced in intake manifold 5 is forwarded to combustion chamber 10 via a fuel injector 35 during an intake stroke of cylinder 65. It is also possible to supply fuel directly into combustion chamber 10 via a second fuel injector 30. The exhaust gas formed in combustion chamber 10 during the combustion of the air/fuel mixture is expelled into an exhaust tract 45 during an exhaust stroke via a discharge valve 40. The combustion of the air/fuel mixture in combustion chamber 10 sets a piston 55 of cylinder 65 into motion. In the case of an Otto engine, a spark plug, which ignites the air/fuel mixture present in combustion chamber 10 at the end of a compression stroke, is provided in addition. A temperature sensor 50 measures a temperature that is characteristic for the operation of internal combustion engine 1, such as a cooling water temperature or an engine oil temperature or also a cylinder head temperature. Measured temperature T is forwarded to an engine control 15. Engine control 15 triggers first fuel injector 25 and second fuel injector 30 for the injection of fuel. This triggering is accomplished in a manner known to one skilled in the art, as a function of the desired engine load and the engine speed. In addition, the triggering of fuel injectors 25, 30 as a function of temperature T is already known, as well.

The use of first fuel injector 25 and second fuel injector 30 makes it possible to realize what is known as a dual-injection system. This is to be understood as a fuel injection system which is able to introduce the fuel quantity required for the combustion both into intake manifold 5 using the first fuel injector 25, and directly into combustion chamber 10 using second fuel injector 30. In such a system first fuel injector 25 is normally developed as low-pressure fuel injector and, as shown in FIG. 1, disposed in front of intake valve 35 in intake manifold 5. Second fuel injector 30 is developed as high-pressure fuel injector, for instance. The setpoint fuel quantity to be injected may be split between first fuel injector 25 and second fuel injector 30 or be injected in full by only one of the two fuel injectors 25, 30.

Such systems are generally used for Otto engines and have a number of advantages. In particular, the advantages of the two different injection methods, i.e., the intake manifold injection method and the direct injection method, are able to be combined depending on the operating conditions of internal combustion engine 1. According to the present invention, it is now intended to optimize the splitting of the setpoint fuel quantity to be injected into a first quantity to be injected into intake manifold 5 via first fuel injector 25, and into a second fuel quantity to be injected directly into combustion chamber 10 of internal combustion engine 1 via second fuel injector 30, as a function of temperature T.

Figure 2:
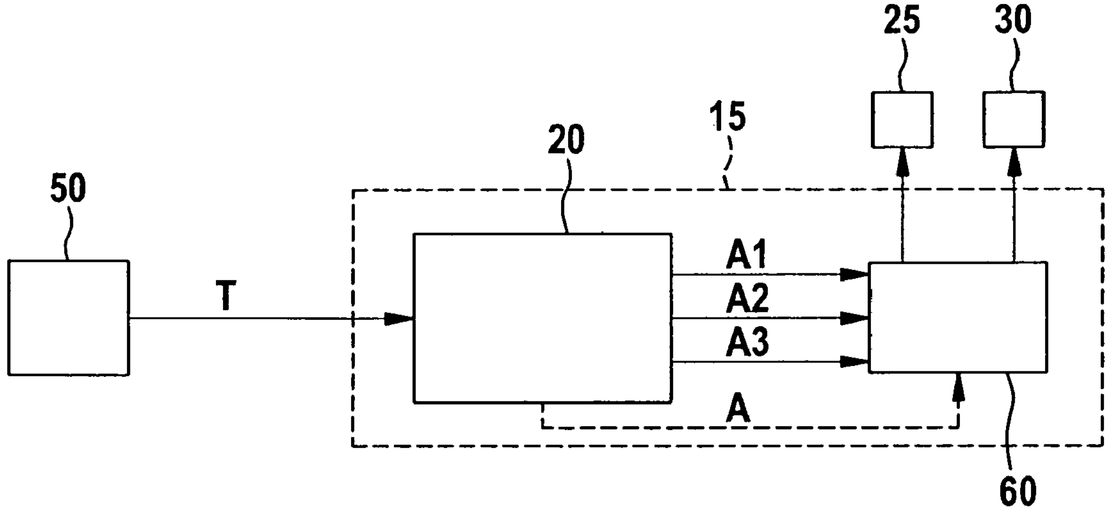
FIG. 2 shows a schematic block diagram illustrating an example embodiment of the device according to the present invention and an exemplary method of the present invention.

FIG. 2 shows a schematic block diagram for illustrating the device and the method according to the present invention, which device is embodied by the engine control 15, and which method may be implemented in engine control 15 in the form of software and/or hardware, for instance.

Engine control 15 includes a distribution unit 20, to which instantaneous temperature values T measured by temperature sensor 50 are forwarded in the form of a temperature signal. Depending on the design, distribution unit 20 determines one or more output signals as a function of the temperature signal or of temperature values T and transmits them to an implementation unit 60. In the example of FIG. 2, three output signals A1, A1, A3 of distribution unit 20, which are transmitted to implementation unit 60, are shown according to a first specific embodiment. Implementation unit 60 then subdivides the setpoint fuel quantity, determined in a manner known to one skilled in the art, into the first fuel quantity, which is to be injected into intake manifold 5 via first fuel injector 25, and into the second fuel quantity, which is to be injected directly into combustion chamber 10 via second fuel injector 30, as a function of the received output signal(s) from distribution unit 20, and triggers fuel injectors 25, 30 accordingly for the implementation of this distribution.

Distribution unit 20 will be explained in greater detail in the following text. According to a first example embodiment of the present invention, distribution unit 20 is developed in the form of a set of characteristic curves of three characteristic curves A1, A2, A3 for the output signals from distribution unit 20. A first output signal A1 exhibits a steady characteristic of a portion of the setpoint fuel quantity to be injected, which is injected directly into combustion chamber 10 via second fuel injector 30 during a compression stroke of cylinder 65, over temperature T. This characteristic of first signal A1 starts at a first temperature $T_0$ of 0° C., for example, with a share of 100% and then drops more and more steeply to a second temperature $T_1>T_0$; then, i.e., starting at second temperature $T_1$, it drops to zero at a rate of change that decreases in its amount, the value of zero being reached for temperatures that are greater than or equal to a fourth temperature $T_3>T_1$ For temperatures $T<T_0$, first output signal A1 remains at the 100% value.

A second output signal A2 starts with the value of zero at first temperature $T_0$; it subsequently rises more and more steeply to second temperature $T_1$, and then, i.e., starting at second temperature $T_1$ and rising more slowly, reaches an absolute maximum at a third temperature $T_2$, $T_1<T_2<T_3$. For temperatures $T>T_2$, second output signal A2 drops more and more rapidly to fourth temperature $T_3$ and subsequently drops more slowly to the zero value for temperatures $T>T_3$, which zero value is reached at a fifth temperature $T_4>T_3$. Second output signal A2 represents the portion of the setpoint fuel quantity to be injected as a function of temperature T, which injection is implemented into intake manifold 5 via first fuel injector 25.

A third output signal A3 starts with the value of zero at first temperature $T_0$ and, starting at second temperature $T_1$, increases more heavily to fourth temperature $T_3$ in order to increase to the 100% value at a slower rise for temperatures $T>T_3$, which value is attained at fifth temperature $T_4$. For temperatures $T>T_4$, third output signal A3 remains at the 100% value, and second output signal A2 remains at the zero value. For temperatures $T<T_0$, second output signal A2 and third output signal A3 each equal zero. For temperatures $T>T_3$, first output signal A1 equals zero.

Third output signal A3 represents the portion of the injectable setpoint fuel quantity that is injected directly into combustion chamber 10 via second fuel injector 30, but is injected during an intake stroke of cylinder 65. All three output signals A1, A2, A3 exhibit a continuous characteristic over temperature T. Furthermore, the following relationship applies across entire temperature T:

$$A1+A2+A3=100\% \quad (1).$$

At second temperature $T_1$, first output signal A1 intersects second output signal A2, while third output signal A3=0. This means that A1=A2=50% at second temperature $T_1$. At fourth temperature $T_3$, second output signal A2 intersects third output signal A3, and first output signal A1 equals 0. Thus, A2=A3=50% at fourth temperature $T_3$. At third temperature $T_2$, first output signal A1 intersects third output signal A3, and second output signal A2 has an absolute maximum at approximately 90%. The point of intersection between A1 and A2 for A3=0 at second temperature $T_1$ may also lie at random values other than 50%. In this context A1+A2=100%. In an extreme case, it is possible, for instance, that A2=100% and A1=0. The same applies to the point of intersection between A2 and A3 for A1=0 at fourth temperature $T_3$. Here, too, A2+A3=100% applies in general; in an extreme case, it is possible that A2=100% and A3=0, for instance.

Figure 3:
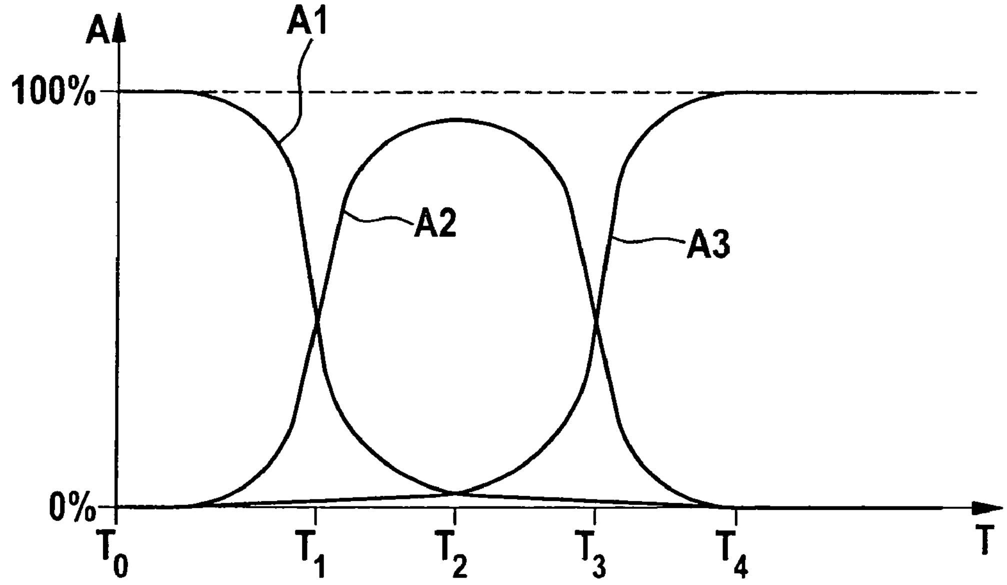
FIG. 3 shows a set of characteristic curves for subdividing a setpoint fuel quantity to be injected according to a first example embodiment according to the present invention.

According to FIG. 3, the second fuel quantity to be injected directly into combustion chamber 10 is therefore subdivided into a first partial quantity to be injected according to third output signal A3 during an intake stroke, and into a second partial quantity according to first output signal A1 to be injected during the compression stroke. The first partial quantity is selected to increase with rising temperatures, and even selected to increase monotonously according to FIG. 3, and the second partial quantity is selected to decrease with rising temperatures T, and even selected to decrease monotonously according to FIG. 3.

According to FIG. 3, the second partial quantity therefore dominates over the first fuel quantity for temperatures $T<T_1$. As a result, the direct injection according to the second partial quantity takes place into the already compressed and thus heated air of combustion chamber 10. The directly injected fuel therefore evaporates better. For temperatures $T<T_1$, the setpoint fuel quantity to be injected is therefore able to be reduced considerably, which in turn reduces the undesired emissions of hydrocarbons, for example.

For temperatures $T_1<T<T_3$, the first fuel quantity injected into intake manifold 5 dominates the second fuel quantity. As a result, excellent homogenization of the air/fuel mixture inside combustion chamber 10 therefore comes about in this temperature range due to the dominating intake-manifold injection. This leads to lower undesired emissions in this temperature range, for instance of hydrocarbons, in comparison with the direct fuel injection. Third temperature $T_2$ lies at a value of approximately 20° C., for example.

For temperatures $T>T_3$, the first partial quantity of the second fuel quantity dominates with respect to the first fuel quantity to be injected into intake manifold 5. The knocking tendency and the self-ignition tendency are reduced in this manner. This is so because at higher temperatures $T>T_3$, the dominant direct injection during the intake stroke lowers the temperature in combustion chamber 10 of cylinder 65 because of the cooler fuel temperature, which is precisely what reduces the knocking and self-ignition tendencies.

For temperatures $T<T_1$, the second fuel quantity is injected in its entirety during the compression stroke, whereas for temperatures $T>T_3$, the second fuel quantity is injected in its entirety during the intake stroke.

Second temperature $T_1$ may therefore be considered a first predefined temperature threshold. Fourth temperature $T_3$ may be considered a second predefined temperature threshold. For temperatures T that are smaller than the first predefined temperature threshold, the direct injection during the compression dominates with regard to the intake-manifold injection. For temperatures $T_1<T<T_3$, i.e., for temperatures between the first and the second predefined temperature thresholds, the intake-manifold injection dominates with regard to the direct injection. For temperatures T that are greater than the second predefined temperature threshold, the direct injection during the intake stroke dominates with regard to the intake-manifold injection.

The characteristic of output signals A1, A2, A3 as a function of temperature T, as well as the selection of temperature values $T_0$, $T_1$, $T_2$, $T_3$ and $T_4$ may be implemented on a test stand, for instance, and/or in driving tests if the internal combustion engine is driving a vehicle, in such a way that, for one, the undesired emissions and, for another, the knocking and self-ignition tendencies are optimally reduced.

For temperature values $T_0$, $T_1$, $T_2$, $T_3$, $T_4$, for instance, and without restricting the universality, the following values may be selected:

$$T_0=-10° \text{ C.}$$

$$T_1=0° \text{ C.}$$

$$T_2=20° \text{ C.}$$

$$T_3=60° \text{ C.}$$

$$T_4=80° \text{ C.}$$

In an especially advantageous manner, the described method or the described device is able to be used during a start-up of the internal combustion engine. This is so because the described temperatures $T_0<T<T_3$ occur predominantly during the start of the internal combustion engine and less so in the post-start operation of the internal combustion engine. For temperatures $T<T_3$, a so-called cold start situation exists in this case, whereas for temperatures $T>T_3$, a warm start is assumed. The temperature range for the cold start is thus subdivided further according to the present invention, i.e., into a first, or lower, temperature range for temperatures $T<T_1$, in which the direct injection during the compression stroke dominates the intake-manifold injection. Such a start is also referred to as direct-injection (DI) stratified charge start. A second temperature range of the cold start with $T_1<T<T_3$ is characterized by the fact that the intake-manifold injection dominates the direct injection. In the following text this start is also referred to as PFI start. For temperatures $T>T_3$, as described, a warm start of the internal combustion engine results, which is also referred to as conventional DI start hereinafter.

DI stands for direct injection, and PFI stands for intake-manifold injection. According to characteristic curves A1, A2, A3 as shown in FIG. 3, it is therefore possible to specify an individual injection strategy for the start-up of the internal combustion engine that is optimal with respect to minimal undesired emissions and minimal knocking and self-ignition tendency in a temperature-dependent manner. According to FIG. 3, the particular injection strategy that is the most advantageous for the start of the internal combustion engine from the standpoint of reducing undesired emissions and reducing the knocking and self-ignition tendencies is then selected in distribution unit 20 from among the quantity of DI-stratified charge start, DI start conventional and PFI start as a function of temperature T, which in this case is the starting temperature of the engine, for example. The PFI start, in which the intake-manifold injection dominates the direct injection, is able to be realized with upstream and/or intake-synchronous injections. Upstream intake-manifold injections are implemented by first fuel injector 25 during the exhaust stroke of cylinder 65, whereas intake-synchronous intake-manifold injections are implemented by first fuel injector 25 during the intake stroke of cylinder 65.

Figure 4:
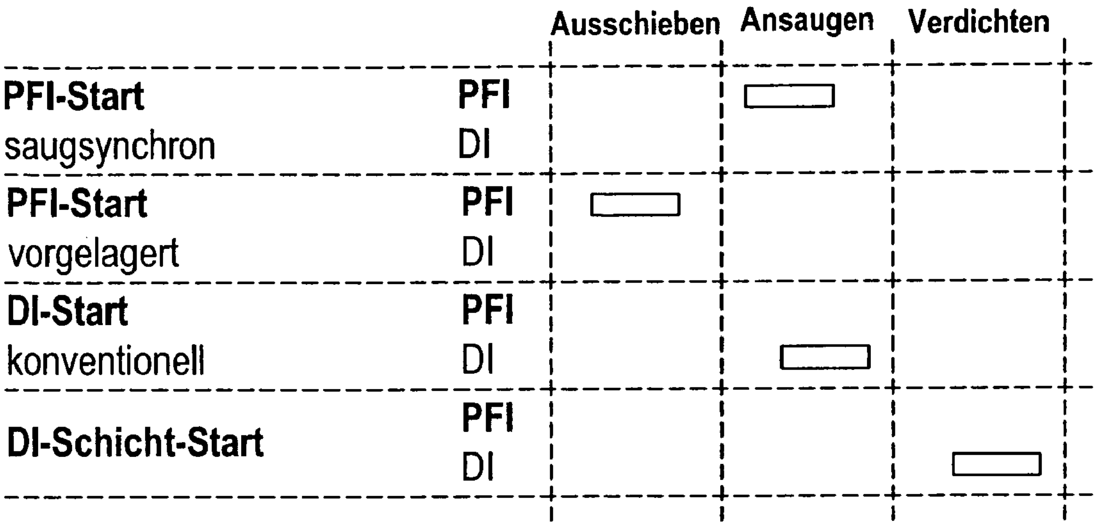
FIG. 4 shows a table of various injection instants and injection types for use in the example embodiments of the present invention.

FIG. 4 shows a table for different injection instants as a function of the selected injection strategy. In the PFI start with intake-synchronous intake-manifold injection, the intake-manifold injection takes place during the intake stroke of cylinder 65. In the PFI start with upstream intake-manifold injection, the intake-manifold injection takes place during the exhaust stroke of cylinder 65. The first fuel quantity in the PFI start may be subdivided into two partial quantities, of which a first one is injected in intake-synchronous manner during the intake stroke, and a second one is injected upstream during a discharge stroke of cylinder 65, into the intake manifold. As an alternative, the first fuel quantity may also be injected only in intake-synchronous manner during an intake stroke or also only upstream during a discharge stroke of cylinder 65. In the conventional DI start, the direct injection into combustion chamber 10 takes place during an intake stroke of cylinder 65 exclusively. In the conventional DI-stratified charge start, the direct injection into combustion chamber 10 takes place during a compression stroke of cylinder 65 exclusively. In this context, the conventional DI start and the DI-stratified charge start according to FIG. 3 may also be superposed in the temperature range $T_1<T<T_3$, so that in this case of the cold start in the upper temperature range, both a direct injection—albeit a small one in comparison with the simultaneously occurring intake-manifold injection—takes place both during an intake stroke and during a compression stroke of cylinder 65, as well.

For temperatures $T<T_1$, the DI-stratified charge start dominates according to FIG. 3. For temperatures $T_1<T<T_3$, the PFI start with intake-synchronous and/or upstream intake-manifold injection dominates. For temperatures $T>T_3$, the conventional DI start dominates.

Figure 5:
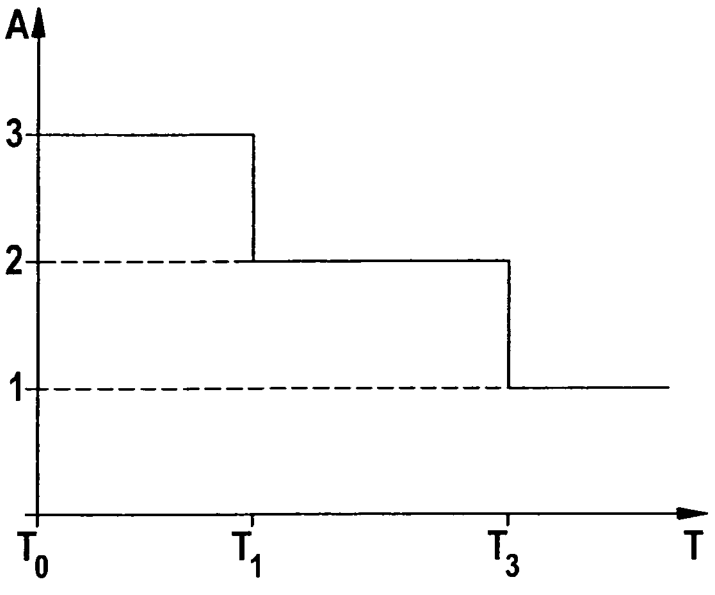
FIG. 5 shows a characteristic curve for subdividing the setpoint fuel quantity to be injected according to a second example embodiment.

According to a second example embodiment, only a single output signal A is output to implementation unit 60 by distribution unit 20. FIG. 5 illustrates one example for a characteristic curve for such a single output signal A as a function of temperature T. According to FIG. 5, the single output signal A, which is indicated by a dashed line in FIG. 2 and is output by distribution unit 20 as an alternative to the three output signals A1, A2, A3 according to FIG. 3, may assume three different values. For $T<T_1$, A equals 3 in this example. For $T_1<T<T_3$, A equals 2 in this example. For $T>T_3$, A equals 1 in this example. The temperature values $T_0$, $T_1$, $T_3$ plotted in FIG. 5 correspond to temperature values $T_0$, $T_1$, $T_3$ in FIG. 3. In contrast to the exemplary embodiment according to FIG. 3, for entire temperature range $T<T_1$ the setpoint fuel quantity to be injected is injected exclusively via the second partial quantity of the second fuel quantity, and thus exclusively-by direct injection in a compression stroke of cylinder 65. In the start case, the DI-stratified charge start would thus be implemented exclusively within the entire temperature range $T<T_1$. Analogously, in entire temperature range $T_1<T<T_3$ the setpoint fuel quantity to be injected is realized exclusively via the first fuel quantity and thus exclusively by intake-manifold injection, so that in the start case, a PFI start with intake-synchronous and/or upstream intake-manifold injection is implemented exclusively.

In the exemplary embodiment according to FIG. 5, for entire temperature range $T>T_3$, the setpoint fuel quantity to be injected is realized exclusively by the first partial quantity of the second fuel quantity and thus exclusively by direct injection during an intake stroke of cylinder 65, so that a conventional DI start is therefore carried out exclusively in the start case. Thus, A=3 stands for an exclusive direct injection in a compression stroke of cylinder 65 or, in the start case, for an exclusive DI-stratified charge start. A=2 stands for an exclusive intake-manifold injection with an intake-synchronous and/or an upstream intake-manifold injection; in the start case, for an exclusive PFI start. A=1 stands for an exclusive direct injection during an intake stroke of cylinder 65, and consequently for an exclusive conventional DI start in the start case. Thus, a steady distribution of the ratio between the first fuel quantity and the second fuel quantity or between the first partial quantity and the second partial quantity of the second fuel quantity as a function of the temperature as it occurs in the exemplary embodiment from FIG. 3 does not take place in the exemplary embodiment according to FIG. 5; instead, an abrupt change of the ratio between the first fuel quantity and the second fuel quantity arises at second temperature $T_1$ and at fourth temperature $T_3$.

Figure 6:
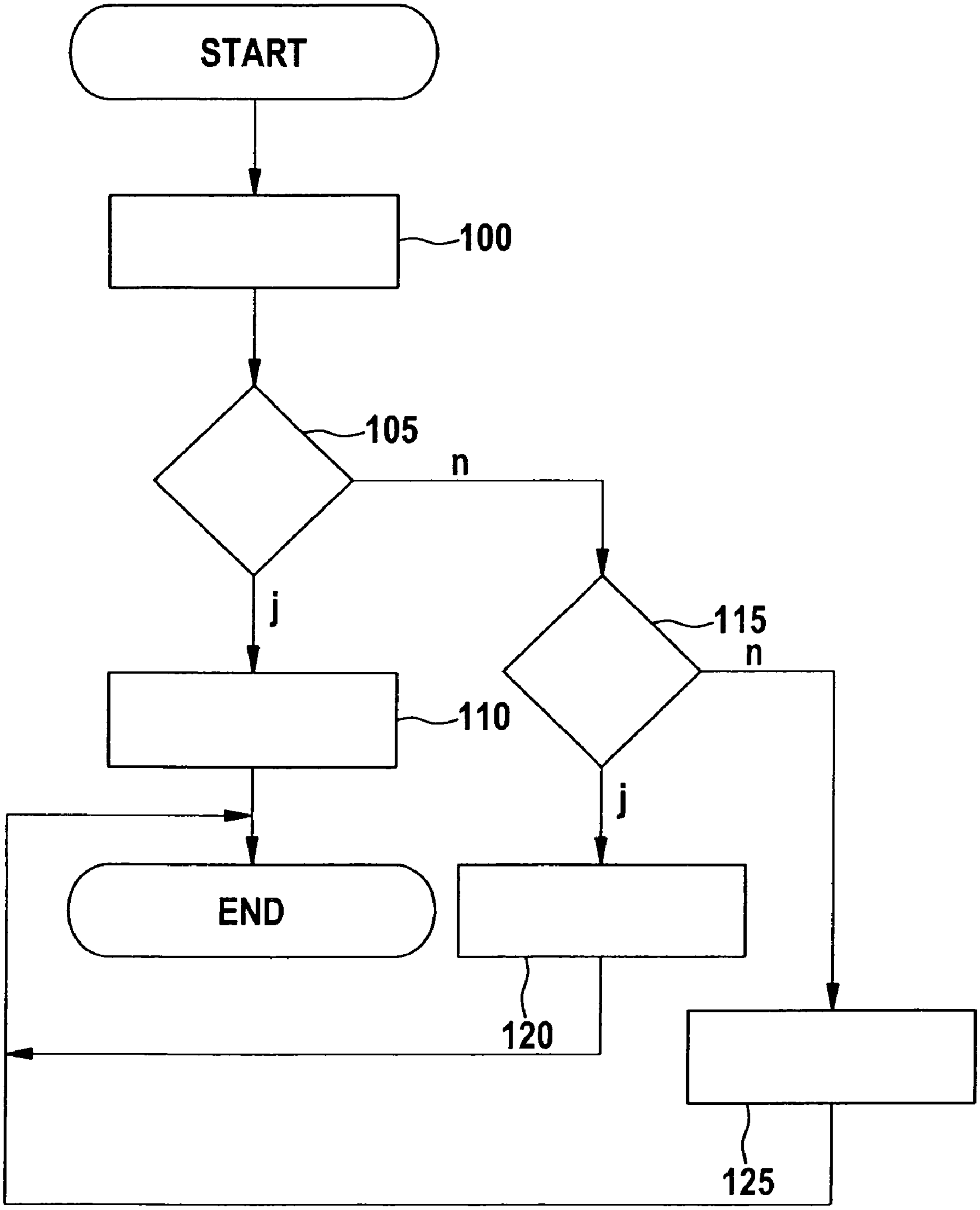
FIG. 6 shows a flowchart for an exemplary sequence of the method of the present invention according to the second example embodiment of the present invention.

An exemplary sequence of the method of the present invention according to the second example embodiment is shown in FIG. 6 with the aid of a flow chart. Following the start of the program, which is triggered, for example, by the arrival of a start request caused by the activation of the ignition of internal combustion engine 1, temperature T is measured by temperature sensor 50 in a program point 100. Afterward, branching to a program point 105 takes place.

In program point 105, distribution unit 20 checks whether temperature T is less than first predefined temperature threshold $T_1$. If this is the case, the method branches to a program point 110; otherwise, the method branches to program point 115.

In program point 110, output signal A=3 is set, and implementation unit 60 is induced to inject the injectable setpoint fuel quantity in its entirety directly into combustion chamber 10 via second fuel injector 30 exclusively during one or more compression strokes of cylinder 35. Then the program is exited.

In program point 115, distribution unit 20 checks whether temperature T is less than second predefined temperature threshold $T_3$. If this is the case, the method branches to a program point 120; otherwise, the method branches to program point 125.

In program point 120, distribution unit 20 sets output signal A=2. In response, upon receipt of value A=2, implementation unit 60 induces the injection of the setpoint fuel quantity to be injected exclusively via first fuel injector 25, by intake-synchronous and/or upstream intake-manifold injection. Then the program is exited.

In program point 125, distribution unit 20 sets output signal A to the value of one. As soon as implementation unit 60 receives the value A=1, implementation unit 60 induces the injection of the setpoint fuel quantity to be injected via second fuel injector 30 exclusively, and during one or more intake strokes of cylinder 65 exclusively. Then the program is exited. The program may be run through repeatedly.

According to one further development of the present invention, it may also be provided that the first fuel quantity injected by first fuel injector 25 is formed by a first fuel type, and the second fuel quantity injected by second fuel injector 30 is formed by a second fuel type that differs from the first fuel type. The two fuel injectors 25, 30 are supplied from different fuel tanks in this case. The method according to the present invention and the device according to the present invention may therefore also be used in what is generally known as bi-fuel systems. Ethanol and gasoline, for instance, may be used as different fuel types. However, it is also possible to use a compressed natural gas (CNG) and gasoline, for instance, as different fuel types.

The output signals A1, A2, A3 in FIG. 3 were selected merely by way of example and described with regard to reducing undesired emissions and reducing the knocking and self-ignition tendencies. If other demands are imposed on the operation of the internal combustion engine, then it is also possible to select different output signals A1, A2, A3. For example, output signal A1 may also be dispensed with entirely and signal A2 be selected instead, in such a way that it corresponds to the sum of signals A1+A2 from FIG. 3. In this case the intake-manifold injection would dominate for the entire temperature range $T<T_3$ or, in the start case, the PFI start having intake-synchronous and/or upstream intake-manifold injection.

Additional advantages may be derived from mixed states, such as a DI-stratified charge start with PFI start, for instance, depending on the application, i.e., as a function of the desired operating conditions of the internal combustion engine. For instance, a smaller PFI-start intake-manifold injection in comparison with the subsequent DI-stratified charge direct injection may be advantageous as far as satisfactory complete combustion of the air/fuel mixture in combustion chamber 10 is concerned, without requiring an undesired heavy fuel enrichment in the PFI-start intake-manifold injection. As described, this is especially advantageous for temperatures $T<T_1$. Moreover, for this temperatures range it is also possible to combine the relatively small PFI-start intake-manifold injection and the superposed DI-stratified charge direct injection with a retarded ignition if internal combustion engine 1 is an Otto engine. In this case, a fluid transition to a catalytic-converter heating phase with a homogenous split injection following the startup of internal combustion engine 1 is possible.

Starting from FIG. 3, the distribution of output signals A1, A2, A3 may also be modified in such a way that even for temperatures $T<T_3$, i.e., at a not excessively high starting temperature in the area of the cold start, preferably in the upper temperature range of the cold start, a dominating PFI start intake-manifold injection with a subsequent considerable conventional DI-start direct injection, which has a larger share in the mentioned temperature range than shown in FIG. 3, represents a good compromise between an operation of the internal combustion engine with a well homogenized air/fuel mixture with a self-ignition tendency on the one hand, and a less well homogenized air/fuel mixture with a lower risk of self-ignition. If third output signal A3 is increased in temperature range $T_1<T<T_3$ in comparison with the development of FIG. 3, and if second output signal A2 is correspondingly lowered, then this runs in the direction of a lower homogenization of the air/fuel mixture due to the reduction of output signal A2, yet with a lower risk of self-ignition due to the higher share of third output signal A3 in comparison with the illustration according to FIG. 3. In other words, if second output signal A2 is lowered in the temperature range $T_1<T<T_3$ and if third output signal A3 is increased instead in the same temperature range, then this leads to a worsened homogenization of the air/fuel mixture due to the lowering of second output signal A2, and to a reduced the risk of self-ignition due to the increase in third output signal A3.

What is claimed is:

1. A method for operating an internal combustion engine, comprising:

determining a setpoint fuel quantity to be injected;

subdividing the setpoint fuel quantity to be injected into a first fuel quantity and a second fuel quantity, wherein the first fuel quantity is for injection into an intake manifold of the internal combustion engine, and the second fuel quantity is for injection directly into a combustion chamber of the internal combustion engine, wherein the subdividing of the setpoint fuel quantity is performed as a function of a temperature characteristic for a selected operation of the internal combustion engine; and continually modifying a ratio between the first fuel quantity and the second fuel quantity as a function of the temperature.

2. The method as recited in claim 1, wherein, for a first temperature value, the first fuel quantity is selected to be smaller than the second fuel quantity, and for a second temperature value that is greater than the first temperature value, the first fuel quantity is selected to be greater than the second fuel quantity.

3. The method as recited in claim 2, wherein, for a third temperature value that is greater than the second temperature value, the first fuel quantity is selected to be smaller than the second fuel quantity.

4. The method as recited in claim 2, wherein the second fuel quantity is subdivided into a first partial quantity injected during an intake stroke and a second partial quantity injected during a compression stroke, wherein the subdivision into the first and second partial quantities is performed as a function of the temperature.

5. The method as recited in claim 4, further comprising:

continuously modifying the subdivision of the second fuel quantity into the first and second partial quantities as a function of the temperature.

6. The method as recited in claim 5, wherein the first partial quantity is increased with rising temperature and the second partial quantity is decreased with rising temperature.

7. The method as recited in claim 4, wherein the first fuel quantity is formed from a first fuel type, and the second fuel quantity is formed from a second fuel type different from the first fuel type.

8. A device for controlling fuel injection in an internal combustion engine, comprising:

a distribution controller configured to:

subdivide a setpoint fuel quantity to be injected into a first fuel quantity and a second fuel quantity, wherein the first fuel quantity is for injection into an intake manifold of the internal combustion engine, and the second fuel quantity is for injection directly into a combustion chamber of the internal combustion engine, wherein the subdividing of the setpoint fuel quantity is performed as a function of a temperature characteristic for a selected operation of the internal combustion engine; and continually modify a ratio between the first fuel quantity and the second fuel quantity as a function of the temperature.

* * * * *